US008527447B2

(12) United States Patent
Dube et al.

(10) Patent No.: US 8,527,447 B2
(45) Date of Patent: Sep. 3, 2013

(54) COLLABORATIVE NETWORKING WITH OPTIMIZED INFORMATION QUALITY ASSESSMENT

(75) Inventors: Parijat Dube, Hawthorne, NY (US); Rahul Jain, Los Angeles, CA (US); Milind R. Naphade, Hawthorne, NY (US)

(73) Assignee: International Business Machines Corporation, Armonk, NY (US)

(*) Notice: Subject to any disclaimer, the term of this patent is extended or adjusted under 35 U.S.C. 154(b) by 753 days.

(21) Appl. No.: 12/709,765

(22) Filed: Feb. 22, 2010

(65) Prior Publication Data
US 2011/0208684 A1 Aug. 25, 2011

(51) Int. Cl.
*G06F 17/16* (2006.01)
*G06F 9/44* (2006.01)

(52) U.S. Cl.
USPC .......................................... 706/52

(58) Field of Classification Search
USPC .......................................... 706/52
See application file for complete search history.

(56) References Cited

U.S. PATENT DOCUMENTS

| 7,130,777 | B2 | 10/2006 | Garg et al. |
| 7,536,315 | B2 | 5/2009 | Tsyganskiy et al. |
| 2002/0095305 | A1 | 7/2002 | Gakidis et al. |
| 2004/0162751 | A1 | 8/2004 | Tsyganskiy et al. |
| 2006/0009994 | A1 | 1/2006 | Hogg et al. |
| 2007/0208613 | A1 | 9/2007 | Backer |
| 2008/0154883 | A1 | 6/2008 | Chowdhury et al. |
| 2008/0274444 | A1 | 11/2008 | Saliba |
| 2009/0125382 | A1 | 5/2009 | Delepet |
| 2009/0254499 | A1 | 10/2009 | Deyo |

OTHER PUBLICATIONS

Avery et al., The "CAPS" Prediction System and Stock Market Returns. [online], Apr. 2009 [retrieved on Oct. 19, 2012]. Retrieved from the Internet<URL: http://www.google.com/search?q=online+feedback+information+quality+assessment+predicted+event+outcome+actual+event+outcome+reputation+score+collective+prediction+value+predicted+outcome+values&source.*
Nicolas Knotzer et al.; Consumer's Interest in Personalized Recommendations: The Role of Product-Involvement and Opinion Seeking; Proceedings of the 40th Hawaii International Conference on System Sciences—2007; pp. 9.
Mizil et al.; How Opinions are recieved by Online Communities: A Case Study on Amazon.com Helpfulness Votes; WWW Apr. 20-24, 2009, Madrid, Spain; pp. 101.
Talwat et al.; Understanding User Behavior in Online Feedback Reporting; EC'07, Jun. 11-15, 2007, Sand Diego, California, USA; pp. 9.

* cited by examiner

*Primary Examiner* — Jeffrey A Gaffin
*Assistant Examiner* — Nathan Brown, Jr.
(74) *Attorney, Agent, or Firm* — Cantor Colburn LLP; William Stock (57) ABSTRACT

A method for implementing information quality assessment includes receiving a value relating to a predicted outcome of an event from each of an entity and at least one other entity and a reputation score for the entity and the other entity. The method also includes generating a collective prediction value for the event that reflects a collective prediction for the event. The collective prediction value is generated from predicted outcome values from the entity and the other entity. The collective prediction value is calculated as a function of reputation scores corresponding to the entity and the other entity.

18 Claims, 4 Drawing Sheets

COLLABORATIVE NETWORKING WITH OPTIMIZED INFORMATION QUALITY ASSESSMENT

BACKGROUND

This invention relates generally to network-based information analytics and optimization processes, and more particularly to collaborative networking optimized with quality assessment of information provided by a network community.

Collaborative networking applications that are enabled through technologies such as Web 2.0 have brought forth the concept of crowd sourcing (also referred to as "the wisdom of crowds") to several e-business and social networking sites. Web 2.0 refers to an increasingly popular type of web application that is primarily distinguished in its ability to enable network users to contribute information for collaboration and sharing. Common collaborative networking applications include, e.g., social software, web syndication, weblogs, and wilds, to name a few. The ability to tap into the wisdom of the crowds through these applications can be a great differentiating asset for an individual or organization that utilizes these applications. For example, content reviews provided by a large online community can be exploited to determine trends, forecasts, and similar data, thereby enabling a content service provider to implement various monetization strategies derived from this collective wisdom.

Some content companies have expressed the need to be able to leverage their social networks in ways that would involve their audience of consumers in aspects of the design and development of the products to be offered to these same consumers. In one aspect, these content companies highlighted the acute need to be able to properly synthesize the wisdom of "their" crowds, i.e., their consumers. The problem is that not every opinion received should be considered equal in terms of the expertise/reputation of those who contribute these opinions. Moreover, this problem may become acute with use-generated content given that exhaustive evaluation of such content can become burdensome for the hosting entity.

There is a need for an objective method for evaluating opinions or predictions gathered over a network from different entities and efficiently using these opinions or predictions to predict a future event (e.g., the success/failure of a product, movie, or a winner in elections, sports tournaments, etc).

SUMMARY

An exemplary embodiment is a method for implementing information quality assessment. The method includes receiving a value relating to a predicted outcome of an event from each of an entity and at least one other entity and a reputation score for the entity and the at least one other entity. The method also includes generating a collective prediction value for the event that reflects a collective prediction for the event. The collective prediction value is generated from predicted outcome values from the entity and the other entity. The collective prediction value is calculated as a function of reputation scores corresponding to the entity and the other entity.

Another exemplary embodiment is a computer program product for use by an information quality assessment program for implementing information quality assessment. The computer program product includes a tangible storage medium readable by a processing circuit and storing instructions for execution by the processing circuit for performing a method. The method includes receiving a value relating to a predicted outcome of an event from each of an entity and at least one other entity and a reputation score for the entity and the at least one other entity. The method further includes generating a collective prediction value for the event that reflects a collective prediction for the event. The collective prediction value is generated from predicted outcome values from the entity and the other entity. The collective prediction value is calculated as a function of reputation scores corresponding to the entity and the other entity.

A further exemplary embodiment is a system for implementing information quality assessment. The system includes a computer processor and an information quality assessment application executable by the computer processor. The information quality assessment application is capable of performing a method. The method includes receiving a value relating to a predicted outcome of an event from each of an entity and at least one other entity and a reputation score for the entity and the at least one other entity. The method further includes generating a collective prediction value for the event that reflects a collective prediction for the event. The collective prediction value is generated from predicted outcome values from the entity and the other entity. The collective prediction value is calculated as a function of reputation scores corresponding to the entity and the other entity.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE SEVERAL VIEWS OF THE DRAWINGS

Referring now to the drawings wherein like elements are numbered alike in the several FIGURES.

DETAILED DESCRIPTION

An exemplary embodiment of the present invention is directed to implementing quality assessment of information provided by entities of a collaborative network environment. Entities refer to online users of a common collaborative network or website. The information quality assessment process enables dynamic evaluation of each participating entity's current reputation or rating according to the entity's performance over opinions or predictions related to other events in the subject area (domain) of the prediction. Further, skill set-based reputation may be used as a starting point when no other information is available.

The information quality assessment process further enables evaluation of the aggregate prediction/forecast based on dynamically computed reputation/rating of each of the participating entities and their individual predictions for a particular subject (e.g., a problem, question, topic). The subjects under prediction are referred to herein as "events." Future events may include e.g., the success/failure of a product, movie, or a winner in elections, sports tournaments, etc. In an exemplary embodiment, the information quality assessment process applies weights to the predictions of entities based on some measure of their predictive power. In an exemplary embodiment, a greater weight is given to the prediction of an entity with higher predictive power as compared to a user with low predictive power. The predictive power of an entity is a measure of how close the predictive outcome of an event made by the entity matches the actual outcome of the event.

Current solutions allow the participating entity to be rated subjectively based on what an assessor (e.g., someone who evaluates the participating entity) feels about the entity. This includes information that might be available to the assessor such as the reviewer's experience/expertise in the particular domain or subject matter. The information quality assessment process provides a novel objective cumulative criterion to assess a participating entity's reputation. The information quality assessment process closes the loop in terms of linking the effect of a community of reviewers' (i.e., participating entities) opinions to the objective metric of what impact this collective opinion had on objective metrics such as the sale of a product, a solution, a service, or the uptake of an idea or concept.

By linking the collective wisdom of the crowd with respect to a product, solution, service, idea, or concept, and then repeating this across many such products, solutions, services, ideas, or concepts, the information quality assessment process provides a mechanism for linking the collective opinion to bottom-line impact, as well as linking the bottom-line impact into an objective rating of the reviewer individually, as well as that of a community of reviewers collectively.

In an exemplary embodiment, the predictive power of an entity is measured in terms of its reputation score. The reputation score is a measure of how well the individual prediction matches a realized event. The reputation of the different entities is continually updated at the end of each decision interval. A decision interval starts with the information quality assessment process collecting predictions/opinions from different participating entities, using them to forecast/predict the unknown outcome of an event, observing the event, and then culminates when the event is actually realized. The information quality assessment process generates forecasts by using the individual predictions from different entities and weighing them using their reputation score.

Figure 1:
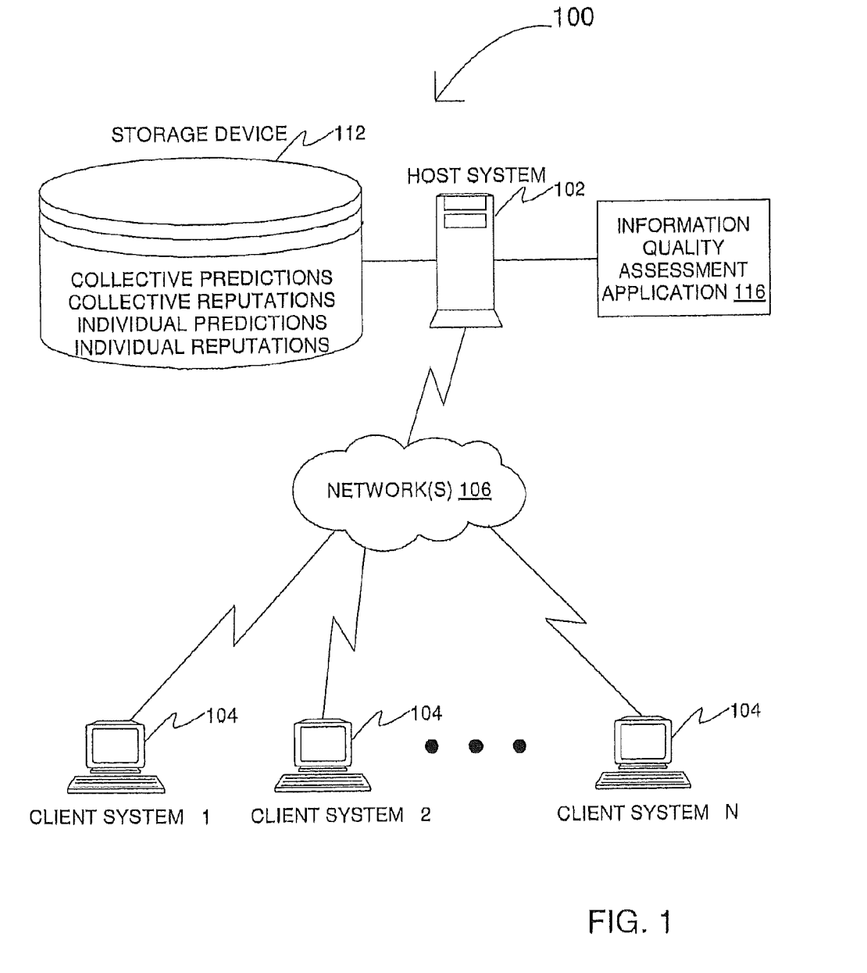
FIG. 1 illustrates a computing system for implementing information quality assessment in an exemplary embodiment of the present invention.

Turning now to FIG. 1, a block diagram of a system 100 upon which the information quality assessment processes may be implemented in exemplary embodiments will now be described. The system 100 of FIG. 1 includes a host system 102 in communication with client systems 104 via one or more network(s) 106. Host system 102 may be implemented using one or more servers operating in response to a computer program stored in a storage medium accessible by the server(s). The host system 102 may operate as a network server (e.g., a web server) to communicate with one or more client systems 104. The host system 102 may handle sending and receiving information to and from client systems 104 and may perform associated tasks.

The host system 102 may also operate as an application server. In accordance with exemplary embodiments, the host system 102 executes one or more computer programs to provide information quality assessment services. These one or more computer programs are referred to collectively herein as an information quality assessment application 116. Alternatively, a portion of the functionality of the information quality assessment application 116 may be implemented via the client systems 104.

Information quality assessment activities may be shared by the client systems 104 and the host system 102 by providing an application (e.g., java applet) to the client systems 104. Alternatively, client systems 104 may include stand-alone software applications for performing a portion of the processing described herein. In yet further embodiments, the information quality assessment system functions may be built in to a web browser application executing on the client systems 104 (not shown). As previously described, it is understood that separate servers may be utilized to implement the network server functions and the application server functions of host system 102. Alternatively, the network server and the application server may be implemented by a single server executing computer programs to perform the requisite functions described with respect to host system 102.

Client systems 104 may be coupled to host system 102 via one or more network(s) 106. Each of the client systems 104 may be implemented using a general-purpose computer executing a computer program for carrying out some of the processes described herein. The client systems 104 may be personal computers (e.g., a lap top, a personal digital assistant) or host-attached terminals. For purposes of illustration, client systems 104 are operated by consumers of Internet services including web services. These consumers are referred to herein as "entities" and "reviewers," as will be described further herein.

In exemplary embodiments, the information quality assessment system 100 shown in FIG. 1 includes a storage device 112. Storage device 112 is in communication with host system 102 and may be implemented using a variety of devices for storing electronic information. It is understood that the storage device 112 may be implemented using memory contained in the host system 102 or it may be a separate physical device, e.g., as shown in FIG. 1. The storage device 112 is logically addressable as a consolidated data source across a distributed environment that includes network(s) 106. Information stored in the storage device 112 may be retrieved and manipulated via the host system 102 and authorized users of client systems 104. The storage device 112 may house content data (e.g., one or more sources of information content subject for review by the client systems 104), content user records, (e.g., information relating to users of client systems 104), as well as individual and collective consumer reviews, assessments, and reputations, among other information desired by the service provider of host system 102. These features are described further herein. In an exemplary embodiment, the host system 102 operates as a database server and coordinates access to application data including data stored on storage device 112.

In an exemplary embodiment, the host system 102 represents a service provider implementing a collaborative application web service (e.g., social/business networking, wild, weblog, news feed, and product/services, to name a few). In addition, the host system 102 represents a provider of the information quality assessment services. However, it will be understood that the host system 102 may alternatively implement the information quality assessment services on behalf of a different network entity (not shown), such as a collaborative content provider, as an application service provider (ASP).

Network 106 may be any type of known network including, but not limited to, a wide area network (WAN), a local area network (LAN), a global network (e.g. Internet), a virtual private network (VPN), and an intranet. The network 106 may be implemented using a wireless network or any kind of physical network implementation known in the art. Client systems 104 may be coupled to the host system 102 through multiple networks (e.g., intranet and Internet) so that not all client systems 104 are coupled to the host system 102 through the same network. One or more of the client systems 104 and the host system 102 may be connected to the network(s) 106 in a wireless fashion.

As indicated above, the information quality assessment system may be implemented via a separate application 116 or may be built into one or more existing applications (e.g., a collaborative application or service implemented through Web 2.0).

Figure 2:
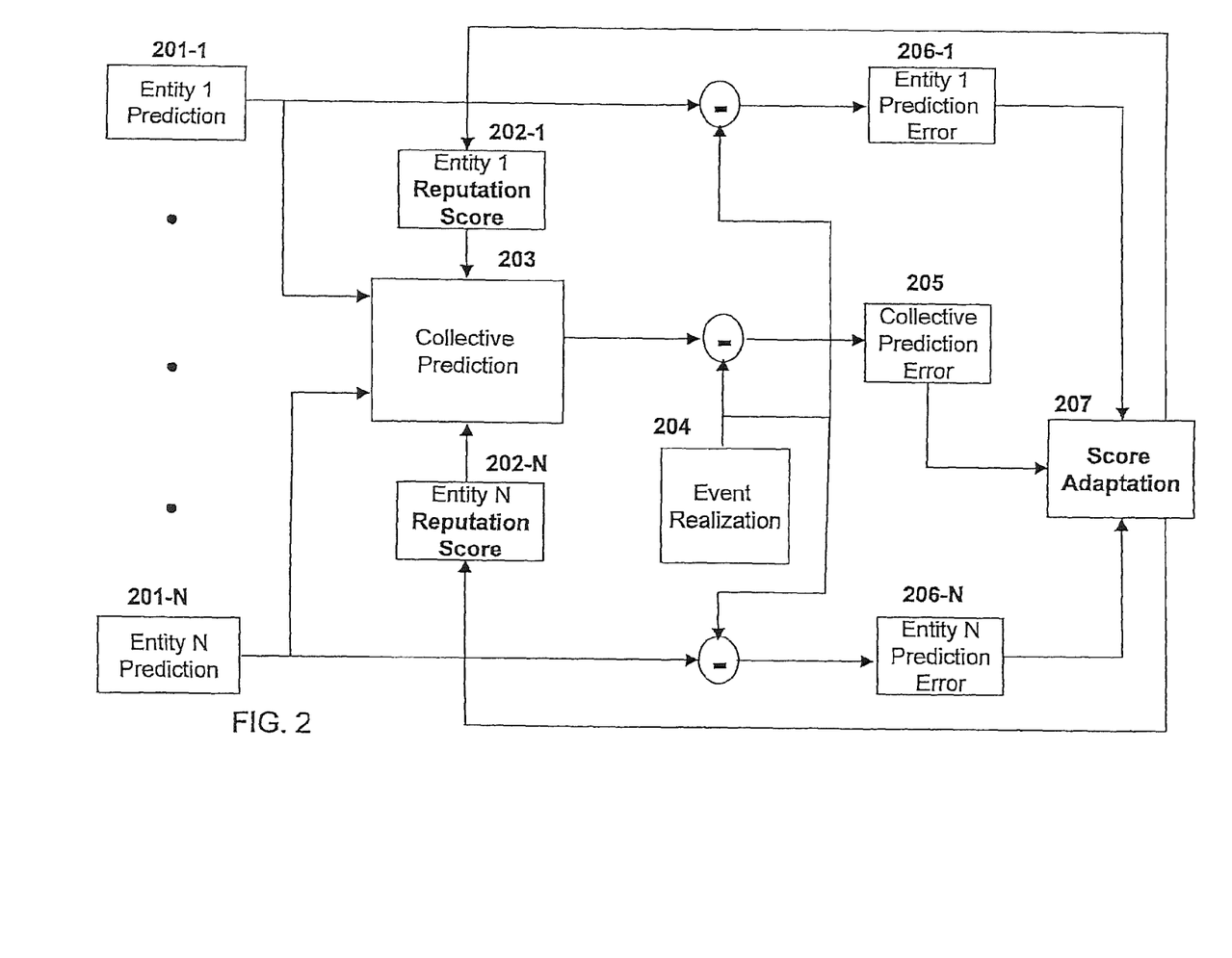
FIG. 2 illustrates a block diagram depicting the flow of data through information quality assessment processes in an exemplary embodiment of the present invention.

Turning now to FIG. 2, a block diagram depicting the flow of data through the information quality assessment processes will now be described in an exemplary embodiment. Individual predictions 201-1 through 201-N (wherein N represents the number of entities) for an event are received by the information quality assessment application 116. These predictions may be in the form of some type of value indicative of the entity's opinion or forecast with respect to particular question, issue, or topic (also referred to herein as "event"). For example, suppose the issue is directed to the proposed success or failure of a book that is yet to be released. By way of non-limiting examples, the prediction value may be represented in terms of the anticipated gross sales of the book, the number of expected copies sold, or a demographic attribute reflecting the type of consumer likely to be interested in the book.

The information quality assessment application 116 processes the individual predictions 201-1 through 201-N and reputation scores 202-1 through 202-N associated with each of the entities (e.g., users of client systems 104) to derive a collective prediction value 203. The processing may include applying weights to the individual predictions based on a measure of the current reputations known for each of the respective entities and averaging the predictions having the applied weights. For example, a prediction value associated with an entity having a score reflecting a positive reputation may be given more weight than a prediction value of an entity having a low reputation score. This processing is described further herein.

Upon determining the actual outcome of the event (also referred to as "event realization"), a value representing the actual outcome 204 is processed with the collective prediction value 203 to derive a collective prediction error 205. The information quality assessment application 116 receives the collective prediction error 205 and modifies or adjusts a reputation score (i.e., score adaptation 207 refers to an updated reputation score) to reflect the deviation between the collective prediction value 203 and the collective prediction error 205. The collective prediction value 203, collective prediction error 205, and collective (updated) reputation score 207 correspond to the aggregate of individual entities (also referred to herein as "community"). Thus, the aggregate of individual entities form a community whose members participate in the prediction of one or more events. The collective prediction error 205 and the reputation score 207 adjustment may be implemented using a variety of techniques, which will be described further herein.

In addition to the collective prediction and reputation score calculation and adjustment, the information quality assessment application 116 also focuses on individual predictions and reputation score adjustments with respect to the event. As shown in FIG. 2, for example, each of the entities (Entity 1 through Entity N, which correspond to one or more client systems 104) provide a corresponding prediction 201-1 through 201-N, which is processed in conjunction with the actual outcome value 204 to determine a corresponding individual prediction error value 206-1 through 206-N. The information quality assessment application 116 adjusts the current reputation scores 202-1 through 202-N for each of the entities (i.e., score adaptation 207 in this context refers to updated individual reputation scores) and, during a subsequent event, the modified adapted individual reputation scores are input as reputation scores 202-1 through 202-N to a process for calculating a collective prediction value as described above, thereby ensuring a closed-loop process with dynamic updates to the individual and collective reputation scores.

Figure 3:
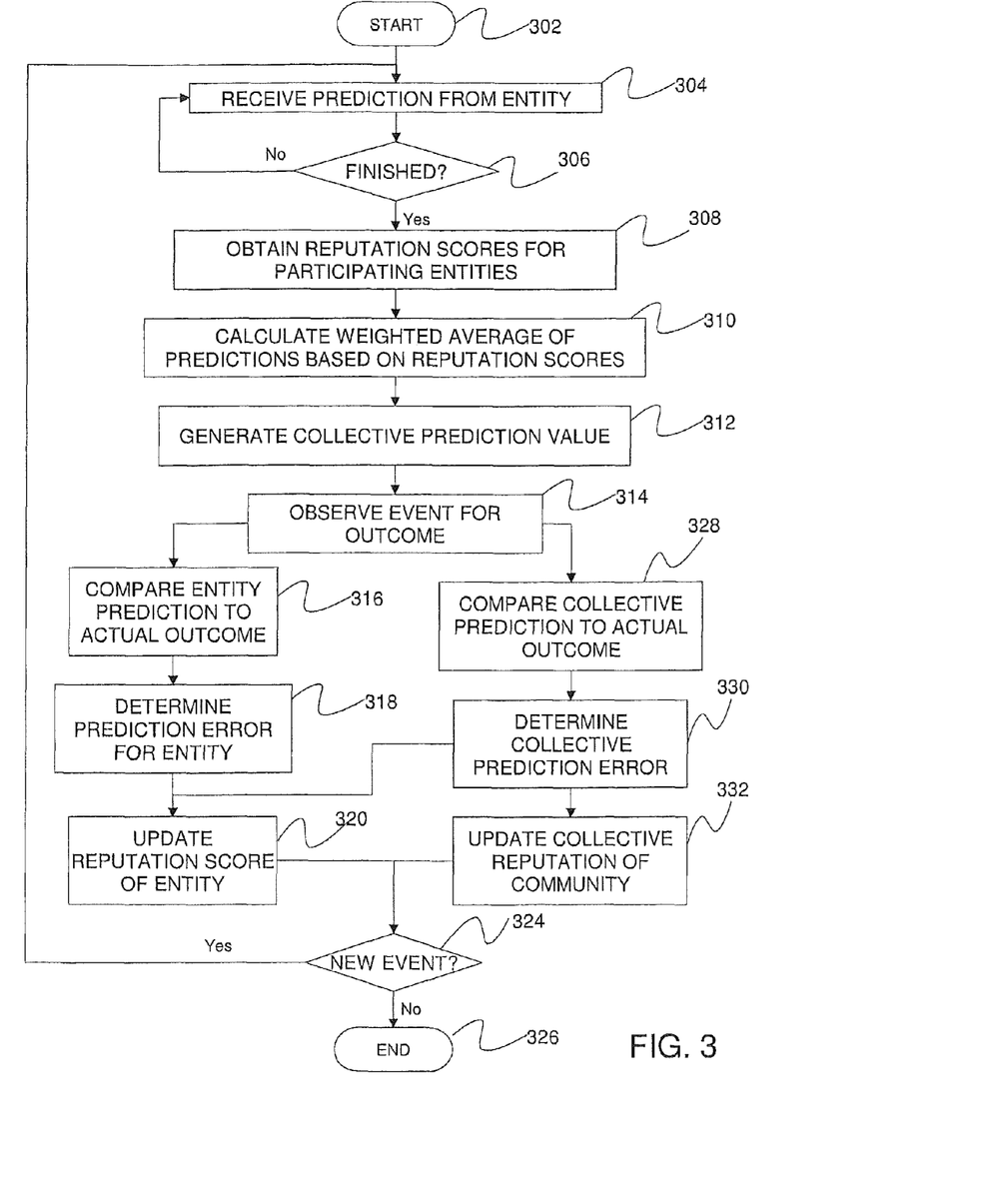
FIG. 3 illustrates a flow diagram describing a process for implementing information quality assessment in an exemplary embodiment of the present invention.

Turning now to FIG. 3, an exemplary process for implementing information quality assessment will now be described. The process begins at step 302 whereby the information quality assessment application 116 receives a prediction from an entity (e.g., one of client systems 104) for an event at step 304. The information quality assessment application 116 determines whether there are any additional predictions for this event at step 306. If so, the process returns to step 304. Otherwise, the application 116 obtains reputation scores for each of the participating entities (i.e., those who have submitted their predictions) at step 308. Once all of the available reputation scores are obtained, the information quality assessment application 116 processes the prediction values in view of corresponding reputation scores (e.g., using a weighted average) at step 310. At step 312, the information quality assessment application 116 generates a collective prediction value from the processing described in step 310.

At step 314, the information quality assessment application 116 determines the actual outcome of the event, e.g., by observation. At step 316, the information quality assessment application 116 compares the predicted outcome value for each of the individual entities with the actual outcome value. The information quality assessment application 116 uses the actual outcome value and the predicted outcome value associated with each entity to calculate a prediction error for the corresponding entities at step 318. The prediction error for the entity (step 318), as well as a collective prediction error for a community to which the entity belongs (step 330), is then used by the information quality assessment application 116 to re-calculate (or derive, if this is the first prediction made by the entity) the reputation score of the entity at step 320. These reputation scores made be stored in storage device 112 for future recall and adjustments. At step 324, it is determined whether a new event is presented to the community for prediction. If so, the process returns to step 304. Otherwise, the process ends at step 326.

Turning back to step 314, once the actual outcome of the event has occurred, the information quality assessment application 116 performs similar processing on the collective prediction values. At step 328, the information quality assessment application 116 compares the predicted outcome value for each of the individual entities with the actual outcome value. The information quality assessment application 116 uses the actual outcome value and the collective predicted outcome value associated with the community to calculate a collective prediction error at step 330. The collective prediction error is then used by the information quality assessment application 116 to re-calculate (or derive, if this is the first prediction made by the community) the reputation score of the community at step 332. These collective reputation scores made be stored in storage device 112 for future recall and adjustments. The process returns to step 324, where it is determined whether a new event is presented to the community for prediction. If so, the process returns to step 304. Otherwise, the process ends at step 326.

As indicated above in FIG. 2, various techniques may be employed to derive the individual and collective prediction values, the individual and collective prediction errors, and the individual and collective reputation scores and adjustments. Some of these techniques will now be described.

Let the number of entities who make predictions be N. Consider a decision time t. At a decision time, the information quality assessment application 116 collects predictions about the outcome y(t) of an unknown event from these N entities. Let the predictions of y(t) made by these N entities be $x_1(t)$, $x_2(t)$, ..., $x_N(t)$. The information quality assessment application 116 uses predictions from these N entities to forecast the value of y(t). The information quality assessment application 116 generates a collective prediction p(t) as a function of the entities' predictions and their reputation scores. One approach may be to use a weighted average of the predictions of different entities where the weight of an entity is its reputation score.

$$p(t) = \frac{\sum_i w_{i,t-1} x_i(t)}{\sum_i w_{i,t-1}}$$

$w_{i,t-1}$ is the reputation score of expert i at decision epoch t.

Define L(p, y) to be the loss for the prediction system (i.e., the collective prediction) and $L(x_i, y)$ to be the loss for entity i (i.e., the individual prediction). The loss is a measure of the mismatch between the prediction value and the actual value of the event. The larger the loss the larger is the mismatch. A measure of the goodness or accuracy of the prediction made by an entity is the cumulative regret, $R_{i,t}$, given by the aggregate of the difference between system loss and entity until time t. Thus, $$R_{i,t} = \sum_{s=1}^{t} L(p(s), y(s)) - L(x_i(s), y(s)).$$

The goal of the information quality assessment application 116 is to minimize this cumulative regret with respect to each entity. The information quality assessment application 116 updates the reputation score of each entity after the event is realized so as to minimize the regret. The idea is to increase the reputation score of those entities whose cumulative regret is small and to decrease the reputation score of entities with larger cumulative regret.

Define a potential function of cumulative regret until time t.

$$\Phi(R_t) = \Psi\left(\sum_{i=1}^{N} \Phi(R_{i,t})\right)$$

Ψ is non-negative, strictly increasing, concave and differentiable function

Φ is a non-negative, increasing and differentiable function

Example is when Φ is exponential and Ψ is logarithmic.

$$\Phi(R) = \frac{1}{\beta} \ln\left(\sum_{i=1}^{N} \exp(\beta R_i)\right), \beta > 0.$$

The reputation scores are then updated with $w_{i,t} = \nabla\Phi(R_{1,t}, \ldots, R_{N,t})_i$. Thus $$w_{i,t} = \frac{\partial \Phi(R_{1,t}, \ldots, R_{N,t})}{\partial R_{i,t}}.$$

Using the above references, the information quality assessment application 116 implements the information quality assessments via the following:

initialize at time t=0, the reputation scores $w_i(0)=1$, for all entities i=1, ..., N.

For each time t=1, 2, ..., performing:

collect predictions $x_i(t)$ from all entities i on the unknown event y(t), compute master prediction $$p(t) = \frac{\sum_i w_{i,t-1} x_i(t)}{\sum_i w_{i,t-1}},$$

observe event y(t), compute cumulative regret $R_{i,t}$ till time t for all entities i using $$R_{i,t} = \sum_{s=1}^{t} L(p(s), y(s)) - L(x_i(s), y(s)).$$

At step 306, update reputation scores of all entities i using $$w_{i,t} = \frac{\partial \Phi(R_{1,t}, \ldots, R_{N,t})}{\partial R_{i,t}}.$$

The collective reputation of a community at time t may be characterized as a function of the loss of the collective. The reputation may be calculated using only the value of loss at time t, L(p(t), y(t)) or may also take into account the past values of the collective loss along with the current value. When L takes value 0 or close to 0, the collective community is making a very accurate prediction of the event y(t); thus, the smaller the value of L, the higher should be the predictive power and hence the reputation of the collective community. One such function is $$a^{-\sum_{s=t-w}^{t} |L(p(s), y(s))|},$$

where w is the history window and a is some positive number greater than 1. When the collective community becomes more and more accurate in its predictions, the exponent will get close to 0 and the rank will be close to 1. In this function, the reputation is represented as a number between 0 and 1, whereby the value of 1 indicates most accurate predictions.

Technical effects and benefits include an optimized collaborative web service that evaluates individual, as well as aggregate, predictions based upon dynamically updated reputations of the individuals and communities participating in the prediction process. The optimized collaborative web service provides high-quality predictions of events as compared with existing collaborative web services.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 4:
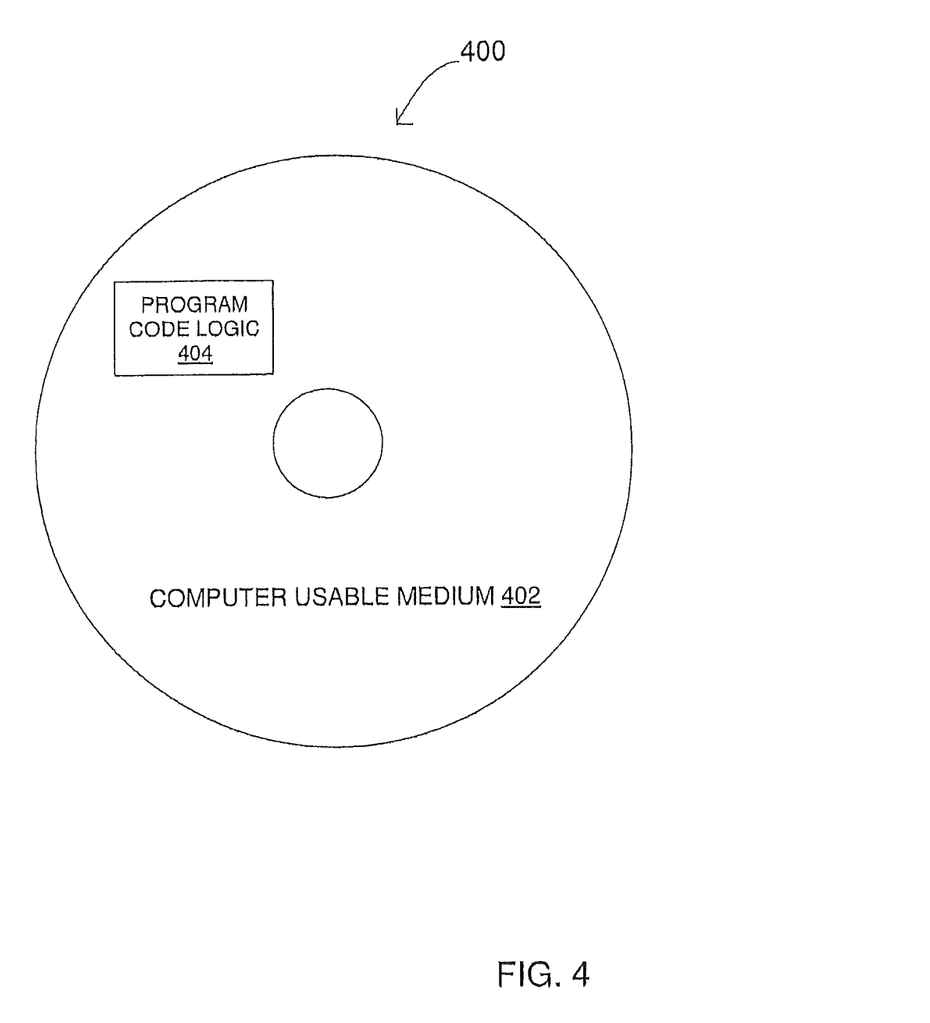
FIG. 4 illustrates a computer program product that may be implemented by an exemplary embodiment.

As described above, embodiments can be embodied in the form of computer-implemented processes and apparatuses for practicing those processes. In exemplary embodiments, the invention is embodied in computer program code executed by one or more network elements. Embodiments include a computer program product 400 as depicted in FIG. 4 on a computer usable medium 402 with computer program code logic 404 containing instructions embodied in tangible media as an article of manufacture. Exemplary articles of manufacture for computer usable medium 402 may include floppy diskettes, CD-ROMs, hard drives, universal serial bus (USB) flash drives, or any other computer-readable storage medium, wherein, when the computer program code logic 404 is loaded into and executed by a computer, the computer becomes an apparatus for practicing the invention. Embodiments include computer program code logic 404, for example, whether stored in a storage medium, loaded into and/or executed by a computer, or transmitted over some transmission medium, such as over electrical wiring or cabling, through fiber optics, or via electromagnetic radiation, wherein, when the computer program code logic 404 is loaded into and executed by a computer, the computer becomes an apparatus for practicing the invention. When implemented on a general-purpose microprocessor, the computer program code logic 404 segments configure the microprocessor to create specific logic circuits.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for implementing information quality assessment, comprising:
    receiving, at a computer, a value relating to a predicted outcome of an event from each of an entity and at least one other entity;
    receiving, at the computer, a reputation score for each of the entity and the at least one other entity;
    generating, at the computer, a collective prediction value for the event that reflects a collective prediction for the event, the collective prediction value generated from predicted outcome values for the entity and the at least one other entity, the collective prediction value calculated as a function of reputation scores corresponding to the entity and the at least one other entity;
    comparing, at the computer, the value relating to the predicted outcome for each of the entity and the at least one other entity with a value specifying an actual outcome for the event;
    determining, at the computer, a prediction error value for each of the entity and the at least one other entity in response to the comparing, the prediction error value reflecting a difference between the value of the predicted outcome and the value of the actual outcome; and
    using the prediction error value, updating, at the computer, the reputation score for the entity and the at least one other entity, the reputation score representing a measure of the accuracy of the predicted outcome of the event.

2. The method of claim 1, wherein the reputation score is derived by a function:

$$w_{i,t} = \frac{\partial \Phi(R_{1,t}, \ldots, R_{N,t})}{\partial R_{i,t}};$$

wherein i represents an index for the entity, t represents a decision time during which predictions are collected for the event, N represents a number of entities making predictions with respect to the event, and R represents a measure of accuracy for the entity.

3. The method of claim 1, further comprising:
    comparing, at the computer, the collective prediction value to a value specifying an actual outcome for the event;
    determining, at the computer, a prediction error value in response to comparing the collective prediction value to the value related to the actual outcome for the event, the prediction error value reflecting a difference between the collective prediction value and the value related to the actual outcome of the event; and
    using the prediction error value of the event to update, at the computer, a reputation score for the collective entity, the reputation score representing a measure of the accuracy of the collective prediction value with respect to the entity and the at least one other entity.

4. The method of claim 3, wherein the reputation score is derived by a function:

$$a^{-\Sigma_{s=t-w}^{t}|L(p(s),y(s))|};$$

wherein y represents an outcome of the event, p represents a collective prediction, L represents a collective prediction loss, t represents a decision time during which predictions are collected for the event, R represents a measure of accuracy for the entity, w represents a history window, and a is some positive number greater than 1.

5. The method of claim 1, wherein the collective prediction value is calculated using a weighted average function, the weighted average function comprising:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

6. The method of claim 1, wherein the collective prediction value is derived by a function:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

7. A computer program product for use by an information quality assessment program for implementing information quality assessment optimization, the computer program product comprising:

a non-transitory storage medium readable by a processing circuit and storing instructions for execution by the processing circuit for performing a method comprising:

receiving a value relating to a predicted outcome of an event from each of an entity and at least one other entity;

receiving a reputation score for each of the entity and the at least one other entity;

generating a collective prediction value for the event that reflects a collective prediction for the event, the collective prediction value generated from predicted outcome values from the entity and the at least one other entity, the collective prediction value calculated as a function of reputation scores corresponding to the entity and the at least one other entity;

comparing the value relating to the predicted outcome for each of the entity and the at least one other entity with a value specifying an actual outcome for the event;

determining a prediction error value for each of the entity and the at least one other entity in response to the comparing, the prediction error value reflecting a difference between the value of the predicted outcome and the value of the actual outcome; and using the prediction error value, updating the reputation score for the entity and the at least one other entity, the reputation score representing a measure of the accuracy of the predicted outcome of the event.

8. The computer program product of claim 7, wherein the reputation score is derived by a function:

$$w_{i,t} = \frac{\partial \Phi(R_{1,t}, \ldots, R_{N,t})}{\partial R_{i,t}};$$

wherein i represents an index for the entity, t represents a decision time during which predictions are collected for the event, N represents a number of entities making predictions with respect to the event, and R represents a measure of accuracy for the entity.

9. The computer program product of claim 7, wherein the method further comprises:

comparing the collective prediction value to a value specifying an actual outcome for the event;

determining a prediction error value in response to comparing the collective prediction value to the value related to the actual outcome for the event, the prediction error value reflecting a difference between the collective prediction value and the value related to the actual outcome of the event; and using the prediction error value of the event to update a reputation score for the collective entity, the reputation score representing a measure of the accuracy of the collective prediction value with respect to the entity and the at least one other entity.

10. The computer program product of claim 9, wherein the reputation score is derived by a function:

$$a^{-\sum_{s=t-w}^{t} |L(p(s), y(s))|};$$

wherein y represents an outcome of the event, p represents a collective prediction, L represents a collective prediction loss, t represents a decision time during which predictions are collected for the event, R represents a measure of accuracy for the entity, w represents a history window, and a is some positive number greater than 1.

11. The computer program product of claim 7, wherein the collective prediction value is calculated using a weighted average function, the weighted average function comprising:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

12. The computer program product of claim 7, wherein the collective prediction value is derived by a function:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

13. A system for implementing information quality assessment optimization, the system comprising:

a computer; and an information quality assessment application executable by the computer, the information quality assessment application capable of performing a method comprising:

receiving a value relating to a predicted outcome of an event from each of an entity and at least one other entity;

receiving a reputation score for each of the entity and the at least one other entity;

generating a collective prediction value for the event that reflects a collective prediction for the event, the collective prediction value generated from predicted outcome values from the entity and the at least one other entity, the collective prediction value calculated as a function of reputation scores corresponding to the entity and the at least one other entity;

comparing the value relating to the predicted outcome for each of the entity and the at least one other entity with a value specifying an actual outcome for the event;

determining a prediction error value for each of the entity and the at least one other entity in response to the comparing, the prediction error value reflecting a difference between the value of the predicted outcome and the value of the actual outcome; and using the prediction error value, updating the reputation score for the entity and the at least one other entity, the reputation score representing a measure of the accuracy of the predicted outcome of the event.

14. The system of claim 13, wherein the reputation score is derived by a function:

$$w_{i,t} = \frac{\partial \Phi(R_{1,t}, \ldots, R_{N,t})}{\partial R_{i,t}};$$

wherein i represents an index for the entity, t represents a decision time during which predictions are collected for the event, N represents a number of entities making predictions with respect to the event, and R represents a measure of accuracy for the entity.

15. The system of claim 13, wherein the method further comprises:

comparing the collective prediction value to a value specifying an actual outcome for the event;

determining a prediction error value in response to comparing the collective prediction value to the value related to the actual outcome for the event, the prediction error value reflecting a difference between the collective prediction value and the value related to the actual outcome of the event; and using the prediction error value of the event to update a reputation score for the collective entity, the reputation score representing a measure of the accuracy of the collective prediction value with respect to the entity and the at least one other entity.

16. The system of claim 15, wherein the reputation score is derived by a function:

$$a^{-\sum_{s=t-w}^{t}|L(p(s),y(s))|};$$

wherein y represents an outcome of the event, p represents a collective prediction, L represents a collective prediction loss, t represents a decision time during which predictions are collected for the event, R represents a measure of accuracy for the entity, w represents a history window, and a is some positive number greater than 1.

17. The system of claim 13, wherein the collective prediction value is calculated using a weighted average function, the weighted average function comprising:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

18. The system of claim 13, wherein the collective prediction value is derived by a function:

$$p(t) = \frac{\sum_i w_{i,t-1} x_i(t)}{\sum_i w_{i,t-1}};$$

wherein i represents an index for the entity, t represents a decision time during which predictions are collected for the event, p represents a collective prediction, t represents a decision time during which predictions are collected for the event, and $w_{i,t-1}$ represents a reputation score of the entity i at the decision time t.

* * * * *